Feb. 18, 1958 W. W. MILLER Re. 24,434

STARTER IGNITION SWITCH

Original Filed July 16, 1951 2 Sheets-Sheet 1

INVENTOR
Walter W. Miller
BY
Synnestvedt & Lechner
ATTORNEYS

STARTER IGNITION SWITCH

Original Filed July 16, 1951 2 Sheets-Sheet 2

INVENTOR
Walter W. Miller
BY
Symmestvedt & Lechner
ATTORNEYS

United States Patent Office

Re. 24,434
Reissued Feb. 18, 1958

24,434

STARTER IGNITION SWITCH

Walter W. Miller, Abington Township, Montgomery County, Pa., assignor to United Specialties Company, Philadelphia, Pa., a corporation of Delaware Original No. 2,679,557, dated May 25, 1954, Serial No. 236,944, July 16, 1951. Application for reissue August 4, 1955, Serial No. 526,580

11 Claims. (Cl. 200—11)

Matter enclosed in heavy brackets [ ] appears in the original patent but forms no part of this reissue specification; matter printed in italics indicates the additions made by reissue.

The present invention relates to new and useful improvements in automobile ignition switches, and more particularly to new and useful improvements in rotary contact mechanism for ignition switches and means to impart rotation to and position the contact mechanism.

The principal object of the present invention is to provide an ignition switch of novel construction which, in addition to the usual "off," *"ignition," or* "on" and "accessory" positions, has a *"starter"* position wherein a circuit is completed to the starting motor.

Another object of the present invention is to provide a novel ignition switch of the stated type wherein a single contact plate formed from a sheet of conducting material may be used to complete all of the required circuits through the switch.

Another and equally important object of the present invention is to provide an ignition switch as set forth having a novel construction and arrangement of cam and follower to limit different positions of the switch mechanism.

*Another object of the invention is to provide in an ignition switch having an "ignition" and a "starter" position, a rotary contact mechanism engaging fixed contacts to energize the vehicle ignition and starter circuits, the rotary contact mechanism being adapted to be resiliently held in the "starter" position and, on release, to be moved by the action of a compression spring back to the "ignition" position, the spring also functioning to hold the contact mechanism in engagement with the fixed contacts.*

*Another object of the invention is to provide in a vehicle ignition starter type switch, circuit making and breaking mechanism arranged to be releasably held in a "starter" position for energizing the vehicle starting circuit and adapted, when moved from the "starter" position, to interrupt the starting circuit so that any arcing which takes place occurs in air.*

These and other objects of the present invention and the various features and details of the operation and construction thereof are hereinafter more fully set forth and described with reference to the accompanying drawings, in which.

Figures 8 to 11, inclusive, are schematic sectional views illustrating the position of the contact plate with respect to the contact terminals in the various operating positions of the switch, *namely, the "off" position, the "starter" position, the "ignition" position, and the "accessory" position;*

Figure 4:
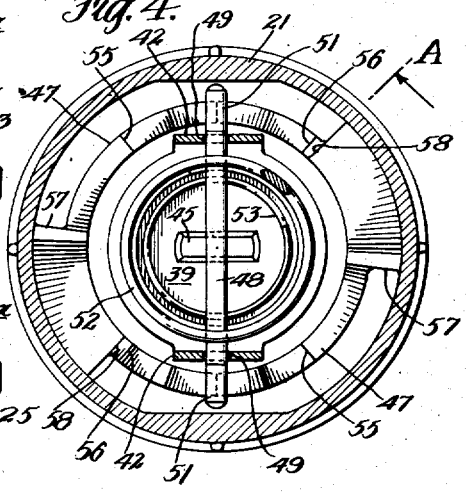
Figure 4 is a transverse sectional view taken on line 4—4, Figure 3.
Figure 5:
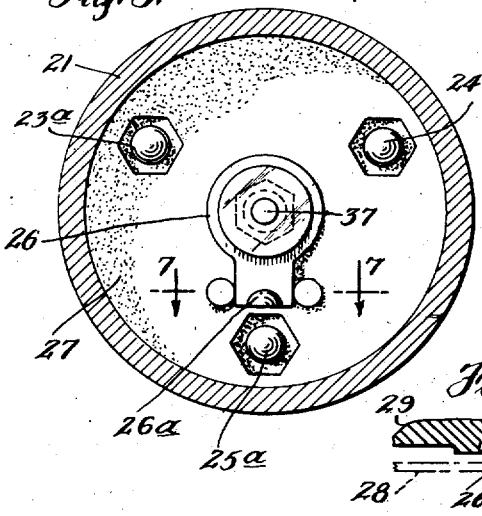
Figure 5 is a transverse sectional view taken on line 5—5, Figure 3.
Figure 6:
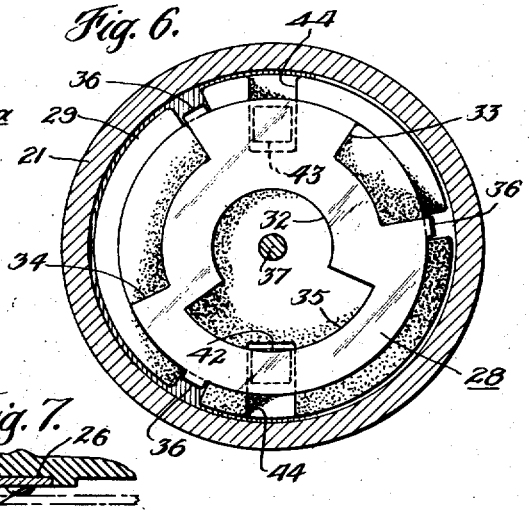
Figure 6 is a transverse sectional view taken on line 6—6, Figure 3.
Figure 7:
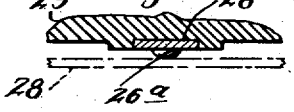
Figure 7 is a fragmentary sectional view taken on line 7—7, Figure 5.
Figure 12:
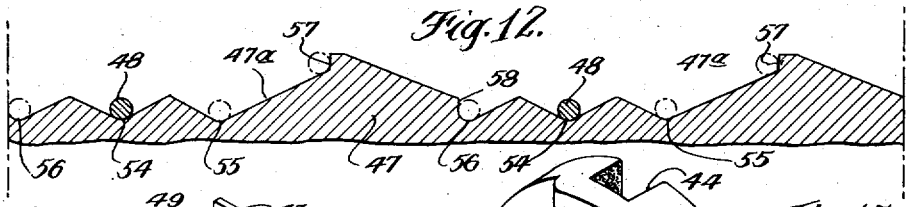
Figure 14:
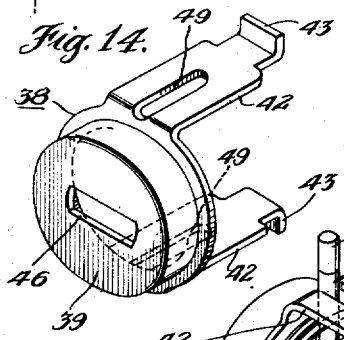
Figure 15:
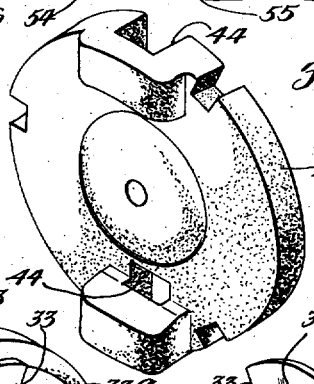
Figure 13:
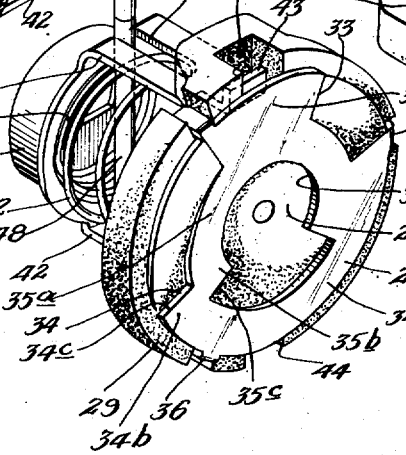
Figure 16:
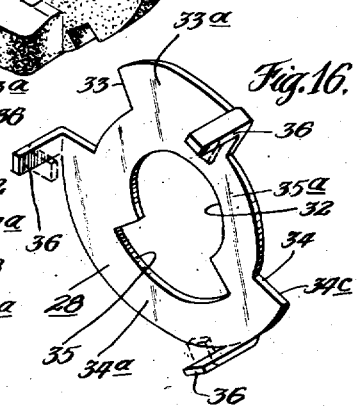

Figure 12 is a developed contour of the lock detent path starting from line A in Figure 4, counterclockwise;

Figure 13 is a perspective view of the contact rotor;

Figure 14 is a perspective view of the rotor adaptor;

Figure 15 is a perspective view of the rotor base which carries the contact plate; and, Figure 16 is a perspective view of the contact plate.

Figure 1:
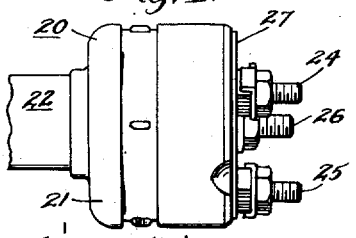
Figure 1 is a side elevational view of an ignition switch made in accordance with the present invention.
Figure 2:
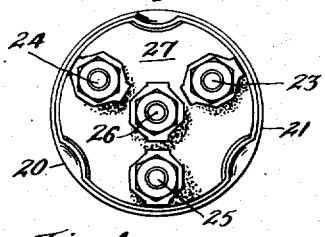
Figure 2 is an end elevational view of the switch illustrated in Figure 1.
Figure 3:
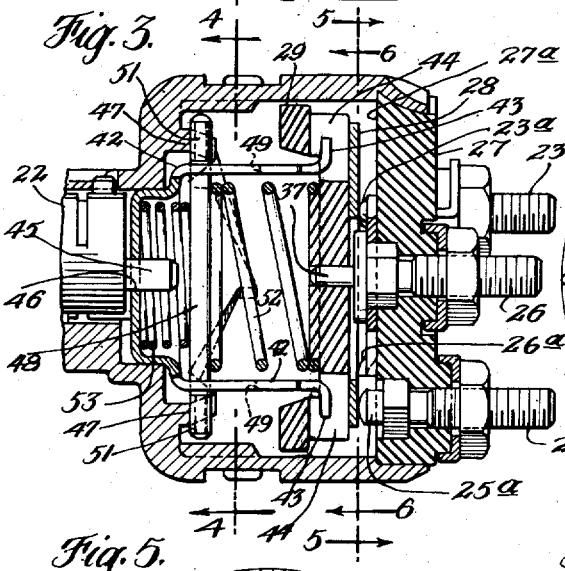
Figure 3 is a nenlarged longitudinal sectional view illustrating the construction of the switch.

Referring more specifically to the drawings and particularly Figures 1 and 2 thereof, reference numeral 20 designates generally an ignition switch which comprises a switch housing 21 having at the front end thereof the usual lock cylinder 22 and at the other end thereof a plurality of terminals 23, 24 and 25 arranged about a central terminal 26.

In accordance with the present invention the terminals 23, 24, 25 and 26 extend through an insulating switch base 27 and provide terminal contacts 23a, 24a, 25a and 26a interiorly of the housing 21. *The terminals 23, 24, 25 and 26 are adapted respectively to be connected with the power, ignition, accessory and starter circuits for the vehicle. The base 27 has a flat face 27a and the terminals 23a, 24a, 25a and 26a extend outwardly therefrom.* These contacts are arranged for engagement selectively by a metal contact plate 28 which is carried by a rotatably mounted switch plate member 29.

As illustrated in Figure 16, the contact plate 28 comprises an annular ring having a central opening 32 therein. Cut out portions 33 and 34 along the outer periphery of the ring and a third cut out portion 35 along the periphery of the central opening 32 allow the contact plate 28 to complete the desired circuits through the terminal contacts. *The switching is accomplished by the two outer switching portions 33a and 34a and the inner switching portion 35a. It will be observed that the switching portions are elongated and arcuately-shaped and that the portions 33a and 34a are substantially equally radially spaced from the center of the face 27a and that the portion 34a is somewhat longer in length than 33a. The portion 35a is at a smaller radial distance than the outer portions. Also it will be noted that the end 34b of the outer portion 34a is closely adjacent the end 35b and that the outer corners or edges 34c and 35c are spaced from the face of the switch plate 29 by a distance equal to the thickness of the contact plate 28.* A plurality of forwardly extending lug portions 36 on the contact plate 28 are utilized to secure the latter to the switch plate member 29 in the relation shown in Figure 13.

The switch plate member 29 is rotatably mounted on a lug 37 formed as an integral part of the central terminal 26. Rotation is imparted to the switch plate member 29 by means of bridge piece 38 constructed as illustrated in Figures 13 and 14. The bridge 38 comprises a forward cylindrical head portion 39 and rearwardly extending parallel leg portions 42. Extending laterally outward from the free ends of the legs 42 are lugs or fingers 43 which are constructed to be received in slots 44 formed in the rotary switch plate 29 and provide a rotational driving connection between the bridge 38 and the switch plate 29.

Rotation of the entire rotor assembly including the contact plate 28, the switch plate member 29 and the bridge 38 arranged as shown in Figure 13 is effected by turning a key in the lock cylinder 22. Extending outwardly from the rear surface of the lock cylinder 22 is a generally rectangular tang portion 45 which is received in a similarly shaped slot 46 in the head portion of the bridge 38. Rotation of the ignition key in the lock cylinder 22 causes similar rotation of the tang 45 thereby imparting rotation to the switch assembly.

Figures 8 to 11 inclusive of the drawings illustrate the position of the contact plate 28 with respect to the contact terminals for the various positions of the ignition switch. The contact plate 28 is insulated from the switch housing and may be energized through the contact terminal 23a which in most instances is connected to the ammeter on the dashboard of an automobile *and thence to the battery, generator or other like source of power.* In the "off" position of the switch shown in Figure 8, the connection between the contact plate 28 and the terminal 23a is broken so that there is no current passing through the switch. *Also, in this position it will be observed that the ignition terminal 24a and the starter terminal 26a are not connected with the contact plate but that the accessory terminal 25a is in contact with the outer switching portion 34a.*

Figure 9:
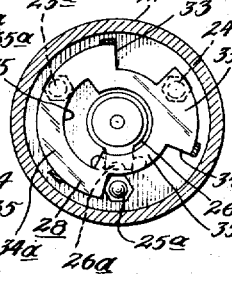

In order to start the motor the contact plate 28 is rotated in the clockwise direction to the position illustrated in Figure 9 in which *the power terminal 23a is in contact with the outer switching portion 34a, the ignition terminal 24a is in contact with the outer switching portion 33a, and the starter terminal 26a is in contact with the inner switching portion 35a.* [it contacts the terminals 23a, 24a and 26a] Contacting the terminal 24a completes the ignition circuit to the motor and the circuit to the starting solenoid of the starting motor is completed through the contact terminal 26a. After the motor has started the contact plate is rotated in the counterclockwise direction to the position illustrated in Figure 10, [thus bringing the contact terminal 26a into alignment with the cut out portion 35 of the contact plate and breaking the circuit to the starting solenoid but still maintaining an unbroken ignition circuit. In this position of the switch, the accessory circuit is completed through the contact terminal 23a which is engaged by the contact plate 28.] *In the "ignition" position, the power terminal 23a remains in contact with the outer switching portion 34a, the ignition terminal 24a remains in contact with the outer switching portion 33a, the accessory terminal 25a is in contact with the outer switching portion 34a and the starter terminal 26a has become disengaged from the inner switching portion 35a.*

*As the contact plate moves from "starter" position to "ignition" position, the outer edge 35c of the inner switching portion 35a comes out of contact with the starter terminal 26a and the break is made "in air," so to speak, because the outer edge 35c is spaced from the face of the switch plate 29 by the thickness of the contact plate 28. This is important from the standpoint of arcing. Usually the starter circuit of a vehicle is highly inductive, and when the circuit is broken, the stored energy is released and hence, can cause arcing between terminal 26a and the portion 35a. Inasmuch as when the starter terminal 26a and the inner switching portion 35a disengage, the starter terminal is spaced from the face of the switch plate 29 (because the last point of contact of the terminal is with the outer edge 35c) the arcing takes place at a point removed from the insulating material of the plate. Thus, charring or burning of the plate 29 is prevented or substantially minimized. Charring is wholly undesirable because it can cause failure or faulty operation of the switch.*

Figure 11:
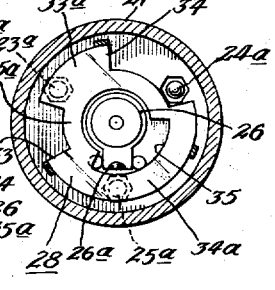

In order to complete solely the circuit to the car accessories, the contact plate 28 is rotated in a counterclockwise direction *from the "off" position* to the position illustrated in Figure 11. [contacting the terminals 23a and 25a which completes the circuit through the ignition switch to the accessories.] *In this position the outer switching portion 33a is in contact with the power terminal 23a and the outer switching portion 34a remains in contact with the accessory terminal 25a. Thus, current may be transferred from the terminal 23a through the contact plate to the terminal 25a. The ignition terminal 24a and the starter terminal 26a are both disengaged from the contact plate.*

In accordance with the present invention, means are provided to properly position the contact plate 28 with respect to the terminals for the various settings of the ignition switch. To this end, there is provided on the forward inner surface of the switch housing 21 diametrically disposed semi-circular cam tracks 47, 47 which are arranged concentrically of the rotational axis of the switch rotor assembly. A pin 48 having its opposite ends disposed in cooperative engagement with the cam tracks 47, 47 is slidably mounted in slots or guideways 49 extending lengthwise of the leg portions 42 of the bridge member 38. A coil spring 52 *of the compression type* is positioned within the bridge piece 38 and between the pin 48 and the switch plate 29 and this spring operates to maintain the pin 48 yieldingly in engagement with the cam tracks 47, 47 while the slots or guideways 49 permit the pin 48 to be displaced against the spring 52 in accordance with variations in the height of the cams. Rollers 51, 51 at the ends of the pin 40 enable the pin to roll easily on the surface of the cam tracks 47, 47.

A smaller coil spring 53, *also of the compression type,* is positioned at the outer side of the pin 48 between it and the forward wall of the bridge piece 38. [By this construction the pin 48 is held under the opposing pressures of the springs 52 and 53 so that rattling of the pin is precluded and the] *The* spring 53 [in conjunction with the spring 52] maintains the bridge 38 against the lock cylinder 22 *and insures positive engagement of the bridge piece and the lock cylinder. In addition the spring* 53 *prevents* [, thereby preventing] rattling of the lock cylinder 22.

Figure 8:
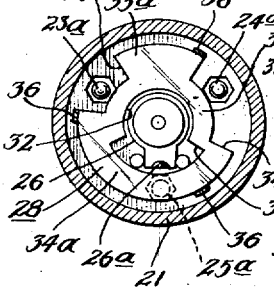
Figure 10:
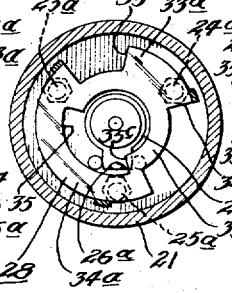

A developed contour of the cam surface is illustrated in Figure 12 of the drawing in order to show the relative positions of the pin 48 with respect to the cam track 47 in the various settings of the ignition switch. Each cam track 47 has three low portions *or detents* 54, 55 and 56 in which the pin 48 may be engaged when the switch is turned to its "off" position, "on" position, or "accessory" position, respectively, as shown in Figures 8, 10 and 11. These low portions of the cam track serve to properly position *the bridge piece and the switch plate, hence, the* contact plate with respect to the contact terminals.

When the contact plate 28 is rotated to its extreme clockwise position, as illustrated in Figure 9, in order to complete the circuit to the starting solenoid, the pin 48 rides up *the inclined surface 47a of* the cam track 47 to the right-hand stops 57, 57 as shown in Figure 12, and upon release of the ignition key, the pin 48 and cam track 47 in cooperation with *compression* spring 52, cause the switch rotor to move counterclockwise to the *"ignition" or* "on" position in which the pin 48 is positioned at the low portion 55 of the cam track 47. The extreme counterclockwise position of the contact rotor is limited by the left-hand stops 58 which are adjacent to the low portions 56 on the cam track 47.

From the foregoing it will be observed that the present invention provides a novel ignition switch which, in addition to the usual "off," *"ignition," or* "on" and "accessory" positions, also has a *"starter"* position wherein a circuit is completed to the starting motor. The invention also provides an ignition switch having a novel construction of cam and follower to limit the different positions of the switch mechanism. Furthermore, the present invention provides a novel ignition switch wherein a single contact plate formed from a sheet of conducting material may be used to complete all of the required circuits through the switch. *Further, the present invention provides a starter ignition switch wherein a single compression spring performs the function of keeping the fixed and movable contacts in engagement, and also the func-*

*tion of causing the switch to be moved from a "starter" position to an "ignition" position.* In addition, the present invention provides a novel ignition switch having the features and characteristics set forth, which is easily and cheaply manufactured and is entirely efficient and effective in operation and use.

While a particular embodiment of the present invention has been illustrated and described herein, it is not intended to limit the invention to such disclosures, and changes and modifications may be made therein and thereto within the scope of the following [claim.] *claims.*

I claim:

*1.* In a starter ignition switch comprising a generally cylindrical housing having a plurality of contact terminals positioned interiorly thereof, a switch plate assembly in said housing mounted for rotary movement about the longitudinal axis of said housing, a contact plate carried by said switch plate for engagement with said contact terminals, a bridge piece comprising a cylindrical head portion and forwardly extending parallel leg portions terminating in lugs engaging said switch plate and actuable to impart rotation thereto, a cam track arranged concentrically about the rotational axis of said switch plate adjacent the junction between the head and leg portions of said bridge piece, a detent pin mounted in longitudinal slots in the parallel leg portions of said bridge piece, spring means intermediate said leg portions in engagement with said switch plate resiliently urging said detent pin into engagement with said cam track, and second spring means positioned between said detent pin and the cylindrical head of said bridge piece to prevent rattling of said bridge piece, said second spring means being weaker than said first spring means whereby said first spring means maintain the detent pin in engagement with the cam track.

*2. In a starter ignition switch, an insulated base having a substantially flat face; an ignition terminal, a power terminal and a starter terminal fixedly mounted in said base and extending outwardly from said face; a substantially flat operatively non-resilient contact plate mounted in face-to-face engaging relationship with said fixed terminals and spaced from said base and adapted for rotational movement with respect to said terminals to an "off" position, an "ignition" position and a "starter" position, the plate having a plurality of arcuately-shaped elongated switching portions adapted to be aligned with respect to said fixed terminals in a predetermined manner in each of said positions; and means to support and rotate said contact plate with respect to said fixed terminals.*

*3. In a starter ignition switch, an insulated base having a substantially flat face; an ignition terminal, a power terminal and a starter terminal fixedly mounted in said base and extending outwardly from said face; a substantially flat contact plate mounted in face-to-face, engaging relationship with said fixed terminals and spaced from said base and adapted for rotational movement with respect to said terminals to an "off" position, an "ignition" position and a "starter" position, the plate having a plurality of arcuately-shaped elongated switching portions adapted to interconnect said power terminal with said ignition terminal in said "ignition" and in said "starter" positions and said power terminal with said starter terminal only in said "starter" position; and means to support and rotate said contact plate with respect to said fixed terminals.*

*4. In a starter ignition switch, an insulated base having a substantially flat face; an ignition terminal, a power terminal, an accessory terminal and a starter terminal disposed in said base and extending outwardly from said face; and a substantially flat contact plate mounted in face-to-face, engaging relationship with said fixed terminals and spaced from said base and adapted for rotational movement with respect to said terminals to an "off" position, an "accessory" position, an "ignition" position and a "starter" position, the plate having a plurality of arcuately-shaped elongated switching portions adapted to interconnect said power terminal with said ignition terminal in the "starter" and "ignition" positions, said power terminal with the accessory terminal in said "ignition" and "accessory" positions and said power terminal with said starter terminal only in said "starter" position, and mechanism to support and rotate said contact plate with respect to said fixed terminals.*

*5. In an ignition switch, an insulated base having a substantially flat face; an ignition terminal, a power terminal and an accessory terminal; a substantially flat operatively non-resilient contact plate mounted in face-to-face, engaging relationship with said fixed terminals and spaced from said base and adapted for rotational movement with respect to said terminals to an "off" position, an "ignition" position and an "accessory" position, the plate having a plurality of arcuately-shaped elongated switching portions adapted to interconnect said power terminal with said ignition terminal and said accessory terminal in said "ignition" position and interconnect said power terminal only with said accessory terminal in said "accessory" position, and mechanism to support and rotate said contact plate with respect to said fixed terminals.*

*6. In a starter ignition switch: an insulated base having a substantially flat face; an ignition terminal, a power terminal and an accessory terminal disposed in said base and extending outwardly from said face and each arranged substantially radially equi-distant from the center of said face; a starter terminal disposed in said base and extending outwardly from said face, the starter terminal being arranged adjacent said accessory terminal but at a smaller radial distance from the center of said face; a substantially flat contact plate mounted for movement over said base whereby to selectively interconnect said terminals, the contact plate having two arcuate outer switching portions, one of which is longer than the other and an inner arcuate switching portion, the outer arcuate portions being at substantially the same radial distance from the center of said face as said ignition power and accessory terminals and the inner portion being at substantially the same radial distance from said center as said starter terminal, one end of said longer portion being disposed closely adjacent one end of said inner portion, first said one end having an edge spaced from said face and the outer and inner portions being electrically interconnected; and means to support and rotate said contact plate over said fixed terminals.*

*7. In a starter ignition switch: an insulated base having a substantially flat face; an ignition terminal, a power terminal and an accessory terminal disposed in said base and extending outwardly from said face and each arranged substantially radially equidistant from the center of said face; a starter terminal disposed in said base and extending outwardly from said face and arranged adjacent said accessory terminal but at a smaller radial distance from said center; a substantially flat contact plate having two outer arcuate switching portions, one of which is longer in length than the other and an inner arcuate switching portion, the outer and inner portions being electrically interconnected; and means to rotate said contact plate over said fixed terminals whereby to establish the following positions and interconnections: an "off" position wherein the power, ignition and starter terminals are disengaged from the plate and the accessory terminal is engaged with said longer outer portion; an "ignition" position wherein the power and accessory terminals are engaged with said longer outer portion, the ignition terminal is engaged with said shorter outer portion and the starter terminal is disengaged from the plate; a "starter" position wherein the power terminal is engaged with said longer outer portion, the ignition terminal is elongated with said shorter outer portion, the starter terminal is engaged with said inner portion and the accessory terminal is disengaged from the plate; and "accessory" position wherein the power terminal is engaged with said*

*shorter portion, the accessory is engaged with said longer portion and the starter and the ignition terminals are disengaged from the plate.*

*8. In a starter ignition switch for an automotive vehicle, a base having a plurality of fixed contacts including a power terminal, an ignition terminal and a starter terminal; a rotatable member made of insulating material and carrying electrical contact means mounted in face-to-face relation with said fixed terminals; a rotatable bridge piece having driving connections with said rotatable member for rotating the same to an "off" position, an "ignition" position and a "starter" position wherein respectively the contact means is aligned with said fixed terminals in a predetermined manner, the bridge piece being constructed to have a pair of slots extending generally along the rotational axis of said rotatable member; a pair of diametrically opposed cam tracks, each track having a first detent for defining said "off" position and a second detent interconnected to the first and defining said "ignition" position and an abutment for defining said "starter" position interconnected to said second detent by a sloping surface; a pin mounted in said slots for rotation with the bridge piece and with freedom of movement with respect to the bridge piece generally in a direction along said rotational axis and adapted to rest in either of said detents whereby to hold the bridge piece in the "off" position or in the "ignition" position and to engage said abutment and thereby define said "starter" position of said bridge piece; a compression spring interposed between said pin and said rotatable member and urging said pin against said cam track and said contact means against said fixed terminals; and means actuable by a vehicle operator to rotate said bridge piece to said "off" position, said "ignition" position and said "starter" position and the compression spring on release of said means in said "starter" position causing the bridge piece to rotate into said second detent.*

*9. In a starter ignition switch, an insulated base having a substantially flat face; an ignition terminal, a power terminal and a starter terminal fixedly mounted in said base and extending outwardly from said face; a substantially flat contact plate mounted in face-to-face, engaging relationship with said fixed terminals and spaced from said base and adapted for rotational movement with respect to said terminals to an "off" position, an "ignition" position and a "starter" position, the plate having a plurality of arcuately-shaped elongated switching portions adapted to interconnect said power terminal with said ignition terminal in said "ignition" and in said "starter" positions and said power terminal with said starter terminal only in said "starter" position; and means to support and rotate said contact plate with respect to said fixed terminals including spring means providing for said engaging relationship and for moving said plate from said starter position to said ignition position.*

*10. In a starter ignition switch, an insulated base having a substantially flat face; an ignition terminal, a power terminal, an accessory terminal and a starter terminal disposed in said base and extending outwardly from said face; and a substantially flat contact plate mounted in face-to-face, engaging relationship with said fixed terminals and spaced from said base and adapted for rotational movement with respect to said terminals to an "off" position, an "accessory" position, an "ignition" position and a "starter" position, the plate having a plurality of arcuately-shaped elongated switching portions adapted to interconnect said power terminal with said ignition terminal in the "starter" and "ignition" positions, said power terminal with the accessory terminal in said "ignition" and "accessory" positions and said power terminal with said starter terminal only in said "starter" position and mechanism to support and rotate said contact plate with respect to said fixed terminals including spring means providing for said engaging relationship and for moving said plate from said starter position to said ignition position.*

*11. In a starter ignition switch: an insulated base having a substantially flat face; an ignition terminal, a power terminal and an accessory terminal disposed in said base and extending outwardly from said face and each arranged substantially radially equi-distant from the center of said face; a starter terminal disposed in said base and extending outwardly from said face, the starter terminal being arranged adjacent said accessory terminal but at a smaller radial distance from the center of said face; a substantially flat contact plate mounted for movement over said base whereby to selectively interconnect said terminals, the contact plate having two arcuate outer switching portions, one of which is longer than the other and an inner arcuate switching portion, the outer arcuate portions being at substantially the same radial distance from the center of said face as said ignition power and accessory terminals and the inner portion being at substantially the same radial distance from said center as said starter terminal, one end of said longer portion being disposed closely adjacent one end of said inner portion and the outer and inner portions being electrically interconnected; and means to support and rotate said contact plate over said fixed terminals.*

References Cited in the file of this patent or the original patent

UNITED STATES PATENTS

| | | |
|---|---|---|
| 1,418,674 | Risk | June 6, 1922 |
| 1,504,283 | Taylor | Aug. 12, 1924 |
| 1,611,460 | Klish | Dec. 21, 1926 |
| 1,746,887 | Douglas | Feb. 11, 1930 |
| 1,750,280 | Norviel | Mar. 11, 1930 |
| 2,091,470 | Douglas | Aug. 31, 1937 |
| 2,121,671 | Schwarze | June 21, 1938 |
| 2,170,154 | Moore | Aug. 22, 1939 |
| 2,440,690 | Jacobi | May 4, 1948 |
| 2,519,758 | Heidman | Aug. 22, 1950 |
| 2,546,744 | Hasselbaum | Mar. 27, 1951 |
| 2,650,958 | Jacobi | Sept. 1, 1953 |
| 2,663,780 | Hept et al. | Dec. 22, 1953 |

FOREIGN PATENTS

| | | |
|---|---|---|
| 174,408 | Great Britain | Jan. 16, 1922 |
| 597,086 | France | Apr. 21, 1925 |
| 113,440 | Switzerland | May 17, 1926 |